United States Patent
Isogai et al.

(10) Patent No.: US 7,304,279 B2
(45) Date of Patent: Dec. 4, 2007

(54) HIGH-FREQUENCY HEATING APPARATUS WITH BROWNING FUNCTION OF FOOD

(75) Inventors: Mamoru Isogai, Nara (JP); Takahiko Yamasaki, Nara (JP); Mineko Suehiro, Mie (JP); Satomi Uchiyama, Nara (JP); Kazuo Fujishita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/672,053

(22) Filed: Feb. 7, 2007

(65) Prior Publication Data

US 2007/0125775 A1   Jun. 7, 2007

Related U.S. Application Data

(62) Division of application No. 10/499,584, filed on Jun. 18, 2004, and a division of application No. PCT/JP03/00278, filed on Jan. 15, 2003.

(30) Foreign Application Priority Data

| Jan. 31, 2002 | (JP) | ............................. 2002-023042 |
| Jan. 31, 2002 | (JP) | ............................. 2002-023043 |
| Apr. 1, 2002 | (JP) | ............................. 2002-098381 |
| May 24, 2002 | (JP) | ............................. 2002-150323 |

(51) Int. Cl.
*H05B 6/80* (2006.01)

(52) U.S. Cl. ..................... 219/685; 219/730; 219/763; 99/DIG. 14

(58) Field of Classification Search ........ 219/730–735, 219/762–763, 685; 99/DIG. 14; 426/107, 426/109, 234, 243; 126/390.1
See application file for complete search history.

(56) References Cited

U.S. PATENT DOCUMENTS

| 3,662,141 | A | 5/1972 | Schauer, Jr. |
| 4,398,077 | A | 8/1983 | Freedman et al. |
| 4,450,334 | A | 5/1984 | Bowen et al. |
| 4,496,815 | A | * | 1/1985 | Jorgensen .................. 219/730 |
| 4,701,585 | A | 10/1987 | Stewart |
| 6,040,564 | A | 3/2000 | Ueda et al. |
| 6,097,017 | A | 8/2000 | Pickford |

FOREIGN PATENT DOCUMENTS

| EP | 0 417 316 | 3/1991 |
| EP | 0 478 082 | 4/1992 |
| JP | 52-111046 | 7/1977 |
| JP | 62-237223 | 10/1987 |
| JP | 1-139922 | 6/1989 |
| JP | 4-23905 | 2/1992 |
| JP | 8-128650 | 5/1996 |
| JP | 10-2562 | 1/1998 |
| JP | 2000-208248 | 7/2000 |

* cited by examiner

*Primary Examiner*—Philip H. Leung
(74) *Attorney, Agent, or Firm*—Pearne & Gordon LLP

(57) ABSTRACT

The present invention provides a high-frequency heating apparatus which can heat the inside of the subject to be heated by high-frequency heating, and can apply scorch onto the surface of the subject to be heated. The high-frequency heating apparatus comprises a heating room for storing therein a subject to be heated, a heating unit that is provided at the upper portion of the heating room and performs heater heating, a high-frequency generating unit that is provided at the bottom of the heating room and generates a high-frequency wave to perform high-frequency heating, a high-frequency heating element having a high-frequency heat generating film on its rear surface, and a saucer for placing thereon the subject to be heated, in which a gap is provided between the high-frequency heating element and the saucer. Hereby, scorch can be applied onto a surface of the subject to be heated.

12 Claims, 13 Drawing Sheets

| H | a | b | P | TEMPERATURE (°C) | OUTPUT CONVERSION VALUE (W) |
|---|---|---|---|---|---|
| 0 | 0 | 0 | 0 | 120 | 288 |
| 1 | 10 | 10 | 20 | 140 | 252 |
| 2 | 10 | 10 | 20 | 160 | 210 |
| 3 | 10 | 10 | 20 | 200 | 186 |
| 4 | 10 | 10 | 20 | 210 | 180 |
| 5 | 10 | 10 | 20 | 200 | 186 |
| 6 | 10 | 10 | 20 | 205 | 192 |
| 8 | 10 | 10 | 20 | 160 | 192 |
| 10 | 10 | 10 | 20 | 140 | 192 |
| 4 | 8 | 12 | 20 | 220 | 180 |
| 4 | 10 | 10 | 20 | 210 | 180 |
| 4 | 12 | 8 | 20 | 200 | 186 |
| 4 | 14 | 6 | 20 | 190 | 192 |
| 4 | 6 | 10 | 16 | 200 | 186 |
| 4 | 8 | 10 | 18 | 215 | 180 |
| 4 | 10 | 10 | 20 | 210 | 180 |
| 4 | 12 | 10 | 22 | 205 | 180 |
| 4 | 10 | 10 | 20 | 210 | 180 |
| 4 | 10 | 15 | 25 | 200 | 180 |
| 4 | 10 | 20 | 30 | 180 | 192 |
| 4 | 10 | 30 | 40 | 160 | 210 |

— PRIOR ART —

HIGH-FREQUENCY HEATING APPARATUS WITH BROWNING FUNCTION OF FOOD

FIELD OF THE INVENTION

The present invention relates to a high-frequency heating apparatus, which can heat the inside of an subject to be heated by high-frequency heating and apply scorch onto a surface of the subject to be heated.

BACKGROUND ART

Conventionally, as this type of high-frequency heating apparatus, there is, for example, an apparatus as disclosed in Japanese Patent Laid-Open No. 2562/1998. FIG. 13 is a front view showing a microwave oven 1 that is the above conventional high-frequency heating apparatus in perspective, which shows the constitution thereof.

According to the above related art, a microwave generated from a magnetron that is the high-frequency generating apparatus is supplied form a microwave supply port 2 formed on a side wall surface into a heating room 3.

Further, as a food table plate, a surface of a base made of metal such as iron is coated with a thin film-like microwave heating element.

However, in the conventional constitution, since the metal surface is coated with the high-frequency heating element, for example, a microwave heating element, the heating element is close to the metal surface, so that the electric field in the vicinity of the heating element is weak, the amount of absorbing the high-frequency becomes small, and heating value becomes small, whereby there is a problem that the scorch is difficult to be applied.

Further, in order to solve the problem, it is desired that preparation and operation for heating the inside of the subject to be heated and applying scorch onto its surface is easy and cleaning is easy.

Moreover, since the microwave supply port is positioned on the side wall in the conventional constitution, a portion of a high frequency heating element closer to the microwave supply port receives the microwave more strongly, so that there is a problem that unevenness in heating is produced in the high-frequency heating element.

DISCLOSURE OF INVENTION

The invention has been made in order to solve the conventional problem, and its object is to provide a high-frequency heating apparatus which can heat efficiently the inside of the subject to be heated by high-frequency heating, and can apply the scorch onto the surface of the subject to be heated.

The invention has been made in order to solve the conventional problem, and its object is to provide a high-frequency heating apparatus which heats efficiently the inside of the subject to be heated by high-frequency heating, can apply the scorch onto the surface of the subject to be heated, and is easy and convenient in use.

The invention also has been made in order to solve the conventional problem, and its object is to provide a high-frequency heating apparatus that reduces the unevenness in heating.

In order to solve the conventional problem, a high-frequency heating apparatus according to the invention comprises a heating room for storing therein a subject to be heated, a heating unit provided in the heating room, a high-frequency generating unit that generates a high-frequency wave to perform high-frequency heating, a high-frequency heating element, and a metal-made saucer for placing thereon the subject to be heated, in which a gap is provided between the high-frequency heating element and the saucer.

Hereby, the inside of the subject to be heated is efficiently heated by high-frequency heating, and the scorch can be applied onto the surface of the subject to be heated.

Furthermore, in order to solve the conventional problem, a high-frequency heating apparatus of the invention comprises a heating room for storing therein a subject to be heated, a heating unit that is provided at the upper portion of the heating room and performs heater heating, a high-frequency generating unit that is provided at the bottom of the heating room and generates a high-frequency wave to perform high-frequency heating, and a saucer that has a high-frequency heating element on its rear surface and places thereon the subject to be heated.

Hereby, since the saucer having the high-frequency heating element is uniformly heated by the microwave supplied uniformly from the downside, cooking in which scorch can be applied uniformly can be performed.

In order to solve the conventional problem, a high-frequency heating apparatus according to the invention comprises a high-frequency heating element made of ceramic, having a high-frequency heat generating film that absorbs a high-frequency wave and generates heat, and a saucer made of metal for placing thereon the subject to be heated, in which the high-frequency heating element and the saucer are placed with a space between them on rail portions provided on left and right side surfaces of the heating room, and the high-frequency heating element and saucer are fixed to and united with each other by a fixing member.

Hereby, it is possible to provide a cooker which heats efficiently the inside of the subject to be heated by high-frequency heating, can apply the scorch onto the surface of the subject to be heated, and is easy and convenient in use.

A high-frequency heating apparatus according to the first aspect of the invention comprises a heating room for storing therein a subject to be heated, a heating unit provided in the heating room, a high-frequency generating unit that generates a high-frequency wave to perform high-frequency heating, a high-frequency heating element, and a saucer for placing thereon the subject to be heated, in which a gap is provided between the high-frequency heating element and the saucer. Hereby, the inside of the subject to be heated is efficiently heated by high-frequency heating, and the scorch can be applied onto the surface of the subject to be heated.

A high-frequency heating apparatus according to the second aspect of the invention comprises a heating room for storing therein a subject to be heated, a heating unit provided in the heating room, a high-frequency generating unit that is provided at a bottom of the heating room and generates a high-frequency wave to perform high-frequency heating, a high-frequency heating element, and a saucer for placing thereon the subject to be heated, in which a gap is provided between the high-frequency heating element and the saucer. Hereby, since the subject to be heated can be heated from the downside more uniformly, unevenness in heating is more reduced, so that the inside of the subject to be heated is efficiently heated, and the scorch can be applied onto the surface of the subject to be heated.

According to the third aspect of the invention, material reflecting the high-frequency wave is used in the saucer in part or in whole. Hereby, the inside of the subject to be heated is efficiently heated, and the scorch can be applied onto the surface of the subject to be heated.

According to the fourth aspect of the invention, the saucer made of metal is used. Hereby, the inside of the subject to be heated is efficiently heated, and the scorch can be applied onto the surface of the subject to be heated.

According to the fifth aspect of the invention, the metal-made saucer is placed on the high-frequency heating element, and the high-frequency heating element comes into contact with the metal-made saucer at least in the vicinity of a heat generating portion of the high-frequency heating element. Hereby, the inside of the subject to be heated is efficiently heated, and the scorch can be applied onto the surface of the subject to be heated.

According to the sixth aspect of the invention, particularly the saucer according to the first or second aspect is constituted so as to divide the heating room into two parts. Hereby, the high-frequency wave supplied from the downside turns hardly to the upside of the saucer, and the supplying amount of the high-frequency wave to the high-frequency heating element increases, so that the scorch is easier to be applied onto the downside of the subject to be heated.

According to the seventh aspect of the invention, particularly the high-frequency generating unit according to the first or second aspect, which is provided at the bottom of the heating room and generates the high-frequency wave to perform high-frequency heating, is provided with a high-frequency dispersion unit which disperses the high-frequency wave thereby to supply it into the heating room. Hereby, since the subject to be heated can be heated from the downside more uniformly, unevenness in heating becomes smaller.

According to the eighth aspect of the invention, unevenness is provided for the metal-made saucer particularly according to the first or second aspect thereby to provide gaps between the high-frequency heating element and the saucer. Hereby, since the heat of the high-frequency heating element is more easily transmitted to the metal-made saucer, the scorch is more easily applied onto the lower side of the subject to be heated.

According to the ninth aspect of the invention, rails for placing the saucer into the heating room are provided on right and left side surfaces of the heating room particularly according to the first aspect. Hereby, the high-frequency wave supplied from the downside turns hardly upward, and the amount of the high-frequency waves supplied to the high-frequency heating element becomes large, so that the scorch is more easily applied onto the lower side of the subject to be heated.

According to the tenth aspect of the invention, a setting net is provided on a turntable in order to set the high-frequency heating element and the saucer into the heating room. Hereby, since the subject to be heated can be heated while it is being turned, the scorch is easier to be applied to the subject to be heated more uniformly.

An apparatus according to the eleventh aspect of the invention comprises a high-frequency heating element and a saucer made of metal, in which the high-frequency heating element is held at the lower portion of the saucer. Hereby, since the high-frequency heating element units with the saucer, it is not necessary to take out them individually, which is laborsaving.

According to the twelfth aspect of the invention, the saucer is provided with a groove for storing therein juice flowing out from a subject to be heated. Hereby, since oil or the like that has flown out from the subject to be heated is removed, the scorch is applied more readily.

According to the thirteenth aspect of the invention, a non-adhesive film is provided on a surface of the saucer. Hereby, the surface of the saucer is difficult to be stained.

According to the fourteenth aspect of the invention, a heat absorption film that is high in heat absorption rate is provided on a rear surface of the saucer. Hereby, since the heat generated from the high-frequency heating element is more easily absorbed onto the saucer, the scorch is easier to be applied.

According to the fifteenth aspect of the invention, by adjusting height, width, and pitch of the unevenness of the saucer, the heat generating amount can be adjusted.

According to the sixteenth aspect of the invention, a holder made of material that does not causes spark is provided at a portion where the saucer comes into contact with a wall surface of the heating room. Hereby, it is possible to prevent the spark from being caused by the high-frequency between the metal portion of the saucer and the rail portion.

According to the seventeenth aspect of the invention, resin is used as material of the holder. Hereby, the holder is more easily molded, and it is possible to prevent the spark from being caused by the high-frequency between the metal portion of the saucer and the rail portion.

According to the eighteenth aspect of the invention, the saucer and the heating element are held by the holder in between. Hereby, falling-off of the heating element is prevented and simultaneously the spark due to the high-frequency waves between the metal portion of the saucer and the side surface of the heating room can be prevented.

According to the nineteenth aspect of the invention, the saucer and the high-frequency heating element are adhered with putty. Hereby, while the high-frequency heating element is being held by the saucer, heat generation due to the high-frequency waves between the high-frequency heating element and the metal of the saucer is prevented.

According to the twentieth aspect of the invention, the surface of the high-frequency heat generating film of the high-frequency heating element faces in the direction contacting with the saucer. Hereby, it is possible to prevent the high-frequency heat generating film from being damaged.

According to the twenty-first aspect of the invention, the high-frequency heating apparatus comprises a heating room for storing therein a subject to be heated, a heating unit that is provided at the upper portion of the heating room and performs heater heating, a high-frequency generating unit that is provided at the bottom of the heating room and generates a high-frequency wave to perform high-frequency heating, and a saucer that has a high-frequency heating element on its rear surface and places thereon the subject to be heated. Hereby, since the saucer having the high-frequency heating element is uniformly heated by the microwave supplied uniformly from the downside, cooking in which scorch can be applied uniformly can be performed.

According to the twenty-second aspect of the invention, particularly the saucer according to the first aspect is constituted so as to divide the heating room into two parts. Hereby, the microwave supplied from the downside turns hardly to the upside of the saucer, and the supplying amount of the microwave to the high-frequency heating element increases, so that the scorch is easier to be applied onto the downside of the subject to be heated.

According to the twenty-third aspect of the invention, particularly the high-frequency generating unit according to the first aspect, which is provided at the bottom of the heating room and generates the high-frequency wave to perform high-frequency heating, is provided with a high-frequency dispersion unit which disperses the high-frequency wave thereby to supply it into the heating room. Hereby, since the subject to be heated can be heated from the downside more uniformly, unevenness in heating becomes smaller.

According to the twenty-fourth aspect of the invention, rails for placing the saucer into the heating room are provided on right and left side surfaces of the heating room particularly according to the first aspect. Hereby, the microwave supplied from the downside turns hardly upward, and the amount of the microwaves supplied to the high-frequency heating element becomes large, so that the scorch is more easily applied onto the lower side of the subject to be heated.

According to the twenty-fifth aspect of the invention, the saucer particularly according to the first aspect is formed of metal that does not transmit a microwave. Hereby, the microwave supplied from the downside turns hardly upward, and the amount of the microwaves supplied to the high-frequency heating element becomes large, so that the scorch is more easily applied onto the lower side of the subject to be heated.

The high-frequency heating apparatus according to the twenty-sixth aspect of the invention comprises a heating room for storing therein a subject to be heated, a heating unit provided at the upper portion of the heating room, a high-frequency generating unit that generates a high-frequency wave to perform high-frequency heating, a high-frequency heating element having a high-frequency heat generating film that absorbs a high-frequency wave and generates heat, and a saucer made of metal for placing thereon the subject to be heated, in which the high-frequency heating element and saucer are placed with a space between them on rail portions provided on left and right side surfaces of the heating room, and the high-frequency heating element and saucer are joined to and united with each other by a fixing member. Hereby, it is possible to provide a cooker which heats efficiently the inside of the subject to be heated by high-frequency heating, can apply the scorch onto the surface of the subject to be heated, and is easy and convenient in use.

According to the twenty-seventh aspect of the invention, the fixing member is an insertion type, whereby the high-frequency heating element and the saucer are detachably joined. Therefore, since the invention can correspond to the difference in life in a long use between the high-frequency heating element and the saucer, it is not necessary to exchange both of them together, so that maintenance cost is reduced.

According to the twenty-eighth aspect of the invention, the insertion type of fixing members by which the high-frequency heating element and the saucer are detachably joined are provided respectively on the left and right sides in the depth direction of the heating room. Hereby, the fixing member is easy to be inserted onto the rail portions of the heating room, and stains after use of the high-frequency heating element and the saucer can be individually cleaned by separating them, so that the cooker is always clean and cooking can be performed comfortably.

According to the twenty-ninth aspect of the invention, the insertion type of fixing members by which the high-frequency heating element and the saucer are detachably joined are provided respectively on the left and right sides in the depth direction of the heating room by two pieces, that is, four pieces of fixing members are provided in total. Hereby, since large power is not necessary to insert the fixing member, this is convenient for a housewife, and further cost is somewhat low.

According to the thirtieth and thirty-first aspects of the invention, the insertion type of fixing members provided on the left and right sides in the depth direction of the heating room is formed of non-metal body, for example, resin material or ceramic material. Hereby, since gaps can be provided into the heating room at the heat-cooking time, spark generated from the metal-made saucer can be prevented.

A high-frequency heating apparatus according to the thirty-second aspect of the invention comprises a heating room for storing therein a subject to be heated, a heating unit provided at the upper portion of the heating room, a high-frequency generating unit that generates a high-frequency wave to perform high-frequency heating, a high-frequency heating element made of ceramic, having a high-frequency heat generating film that absorbs a high-frequency wave and generates heat, and a saucer made of metal for placing thereon the subject to be heated, in which the high-frequency heating element and the saucer are placed with a space on rail portions provided on left and right side surfaces of the heating room, and the high-frequency heating element and saucer are fixed to and united with each other by an adhesive member. Hereby, though the high-frequency heating element and the saucer cannot be disassembled, it is prevented that they are lost because of storage miss. Further, disadvantage due to wrong use for the disassembly by the user does not occur.

According to the thirty-third aspect of the invention, the high-frequency heating element and the saucer are fixed to and united with each other by the adhesive member, the high-frequency heating element made of ceramic is made longer than the saucer made of metal, and the high-frequency heating element is placed on the rails provided on the left and right side surfaces of the heating room. Hereby, the number of parts is reduced, and the simple constitution is provided.

According to the thirty-fourth aspect of the invention, the high-frequency heating element and the saucer are fixed to and united with each other by the adhesive member, the saucer made of metal has insulating members on its left and right sides in the depth direction of the heating room, and the insulating members are placed on the rails provided on the left and right sides of the heating room. Hereby, since gaps can be provided into the heating room at the heat-cooking time, spark can be prevented.

BEST MODE FOR CARRYING OUT THE INVENTION

Embodiments of the invention will be described below with reference to drawings.

Embodiment 1

Figure 1:
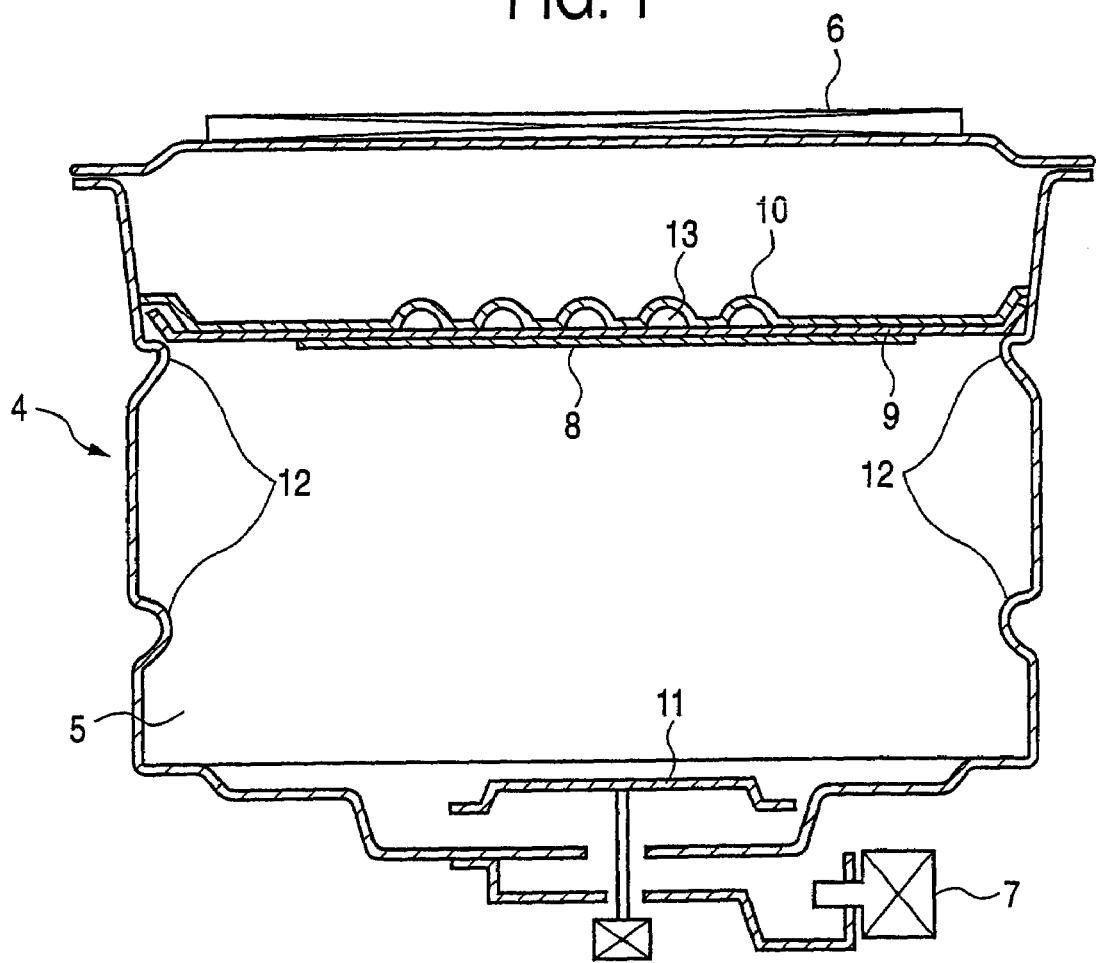
FIG. 1 is a schematic sectional view showing the constitution of a high-frequency heating apparatus according to a first embodiment of the invention.

FIG. 1 is a schematic sectional view showing the constitution of a high-frequency heating apparatus of the invention.

A high-frequency heating apparatus 4 comprises a heating room 5 for storing therein a subject to be heated, a heating unit 6 that is provided in the heating room and performs heater heating, a high-frequency generating unit 7 that is provided at the bottom of the heating room and generates a high-frequency wave to perform high-frequency heating, a high-frequency heating element 9 having a high-frequency heat generating film 8 on its rear surface, and a saucer 10 for placing thereon the subject to be heated.

The high-frequency wave generated from the high-frequency generating unit 7 is uniformly supplied from the downside into the heating room 2 by a high-frequency dispersing unit 11. And, the saucer 10 is placed on rails 12 provided on side surfaces of the heating room to be used.

As the high-frequency heating element 9, a high-frequency heating element 9 made of ceramic is used in which a high-frequency heat generating film 8 made of nitride and boride is provided. As the saucer 10, a saucer having the wavy unevenness on its surface is used, in which a surface of an aluminum-coated steel sheet having gaps 13 is coated with fluorine and a rear surface thereof is coated with black heat-resistant coating.

In case that after preheating was performed for ten minutes in a state where the high-frequency heating element and the saucer were put into the apparatus 4, chicken dark meat used as a subject to be heated was heated for ten minutes simultaneously by an upper heater of 600 W that is the heating unit 6 and by high-frequency waves of 300 W, the inside and the both sides of the meat were heated properly. More particularly, scorch could be evenly applied on the both sides of the meat, so that the chicken dark meat has been roasted well. The water reduction rate is 13%, and the roasted chicken has the proper amount of juice. Further, without requiring labor of overturning the chicken dark meat, the inside of the meat could be also heated and the scorch could be applied onto the both sides of the meat.

We think that this is due to the following reason: Since the gaps 13 are provided, the distance between the high-frequency heat generating film 8 and the metal surface of the saucer 10 becomes large, whereby the strength of electric field on the high-frequency heat generating film 8 becomes high, and heat generation in the high-frequency heat generating film 8 becomes high; and compared with a case where there is no gap, the amount of the high-frequency wave turning to a surface of the saucer 10 is reduced, whereby without raising the water reduction rate of the chicken dark meat, the proper scorch can be applied onto the both sides.

Further, in case that the wavy unevenness was not provided for the surface of the saucer 10 and the gaps 13 were not provided, the scorch on the rear side was light, and many high-frequency waves were supplied to the chicken dark meat, so that the water reduction rate of the chicken dark meat became high (34%), the chicken dark meat contracted thereby to become hard, and the scorch was difficult to be applied onto the rear side.

We think that this is due to the following reason: Since the distance between the high-frequency heat generating film 8 and the metal surface of the saucer 10 is small, the strength of electric field on the high-frequency heat generating film 8 becomes low, heat generation in the high-frequency heat generating film 8 becomes low and the amount of the high-frequency wave turning to the surface of the saucer 10 becomes large, whereby the water reduction rate of the chicken dark meat becomes high, and the scorch becomes difficult to be applied onto the rear side.

Further, the difference in advantage between a case that there is the metal-made saucer 10 and a case that there is no metal-made saucer 10, and the difference in advantage between a case that there is the gap 13 and a case that there is no gap 13 were compared using water heated by the above high-frequency heating apparatus 4. The comparison was performed under the condition where water of 10° C. and 100 ml was heated at 1000 W for 10 seconds.

In case that there was no metal-made saucer, water temperature rose by 5.7° C. Calculated in terms of outputs, 342 W was supplied to the water.

In case that there was the metal-made saucer and there was no gap, water temperature rose by 4.7° C. Calculated in terms of outputs, 282 W was supplied to the water.

In case that there was the metal-made saucer and there was the gap, water temperature rose by 3.0° C. Calculated in terms of outputs, 180 W was supplied to the water.

On the other hand, in case that there was no metal-made saucer, the temperature at the bottom of the high-frequency heating element rose from 23° C. to 30° C., that is, it rose by 7° C.

In case that there was the metal-made saucer and there was no gap, the temperature at the bottom of the high-frequency heating element rose from 23° C. to 25° C., that is, it rose by 2° C.

In case that there was the metal-made saucer and there was the gap, the temperature at the bottom of the high-frequency heating element rose from 23° C. to 34° C., that is, it rose by 11° C.

From the above description, it is found that: when only the high-frequency heating element is used as the saucer and the high-frequency heating is performed, more high-frequency waves are supplied to the subjected to be heated than in case that there is the metal-made saucer.

Further, even if the metal-made saucer is placed on the high-frequency heating element, in case that there is no gap, the temperature of the high-frequency heating element does not rise. Namely, it is found that the high-frequency heating element is difficult to be heated in this case and more high-frequency waves are supplied to the subject to be heated than in case that there is the gap. We think that this causes meat contraction in case of the chicken dark meat, because the many high-frequency waves are supplied to the chicken dark meat though the lower side is scorched.

Further, it is found that by providing the gaps for the metal-made saucer, the amount of the high-frequency waves supplied to the subject to be heated becomes smaller than in case that there is no gap. We think that this gap causes the chicken dark meat to be heated properly without meat contraction and to receive the scorch.

Further, in this example, heater heating and high-frequency heating were simultaneously performed. However, they may be performed individually, or the simultaneous heating and the individual heating may be repeated.

Further, compared with a case where the output port of the microwave is positioned on the side surface, in case that it is positioned on the downside, unevenness in heating is smaller.

Regarding the rail 12, in case that it is arranged longer in the depth direction, a gap between the saucer 10 and the side wall surface becomes smaller, and the high-frequency wave supplied from the downside turns hardly to the upside of the saucer 10, so that the downside of the subject to be heated is more easily scorched.

Regarding the arrangement and constitution of the saucer 10, in order to divide the heating room into up and down portions, the outline of the saucer is formed so that the gap between the saucer and the side wall surface of the heating room and the gap between the saucer and a door for closing the heating room become small, whereby the high-frequency wave supplied from the downside turns hardly to the upside of the saucer, the amount of the high-frequency waves supplied to the high-frequency heating element becomes large, and the downside of the subject to be heated is more easily scorched.

As the heating unit 6, in addition to a tube heater, a sheath heater, or the like, a heater using hot wind may be used.

Further, though the high-frequency heating element 9 has the high-frequency heat generating film 8 on its rear surface, it itself may be formed of ceramic that generates heat by the high-frequency wave.

On the high-frequency dispersing unit 11 located downward, a plate made of ceramic, which is not shown in FIG. 1, is provided at the bottom of the heating room, and it can be used as a table on which an subject to be heated such as a cooking object is placed at the high-frequency heating time. Hereby, the cooking object does not splash on the high-frequency dispersing apparatus 11.

Though the aluminum-coated steel sheet is used in the metal-made saucer 10, any material reflecting the high-frequency wave on its surface can be also used, for example, ceramic base having a high-frequency reflection layer provided by metal coating, metal evaporation, or the like.

Though the aluminum-coated steel sheet is used in the metal-made saucer 10, any metals that do not transmit the high-frequency wave can be used, for example, stainless; aluminum; aluminum alloy; various coated steel sheet such as a galvanized steel sheet, an aluminum zinc alloy coated steel sheet, a copper coated steel sheet, and the like; a cold-rolled steel sheet; clad material; or the like.

Though as the high-frequency heating element 8, nitride and boride are used, metal oxide such as tin oxide, indium oxide or the like, and composite oxide can be also used.

Embodiment 2

Figure 2:
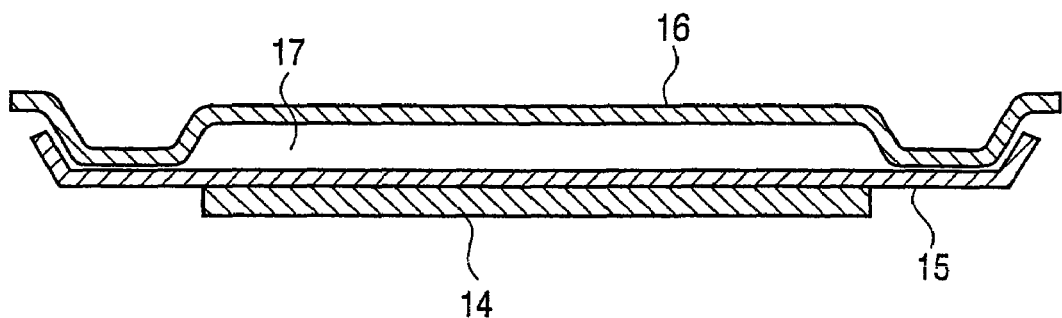
FIG. 2 is a sectional view showing the constitution of a main portion of a high-frequency heating apparatus according to a second embodiment.

FIG. 2 is a sectional view showing the constitution of a main portion of a high-frequency heating apparatus according to a second embodiment.

In FIG. 2, a gap 17 is provided between a high-frequency heating element 15 having a high frequency heat generating film 14 and a saucer 16 made of metal. Other constitution of the high-frequency heating apparatus is similar to that in the first embodiment.

In case that chicken dark meat was heated under the above constitution, scorch could be applied onto the both sides of the meat. We think that this is due to the following reason: Since the distance between the high-frequency heat generating film 14 and the metal surface of the saucer 16 becomes large, the strength of electric field on the high-frequency heat generating film 14 becomes high, and heat generation in the high-frequency heat generating film 14 becomes high; and compared with a case where there is no gap, the amount of the high-frequency wave turning to a surface of the saucer 16 is reduced, whereby without raising the water reduction rate of the chicken dark meat, the proper scorch can be applied onto the both sides.

Further, the high-frequency heating element comes into contact with the metal-made saucer in the vicinity of the high-frequency heat generating film 14 that is a heat generating portion of the high-frequency heating element 15, whereby the heat generated from the high-frequency heat generating film 14 is easily transmitted through the ceramic base material of the high-frequency heating element 15 to the metal-made saucer 16. Hereby, the inside of the subject to be heated is efficiently heated, so that the scorch can be applied onto the surface of the subject to be heated.

Embodiment 3

Figure 3:
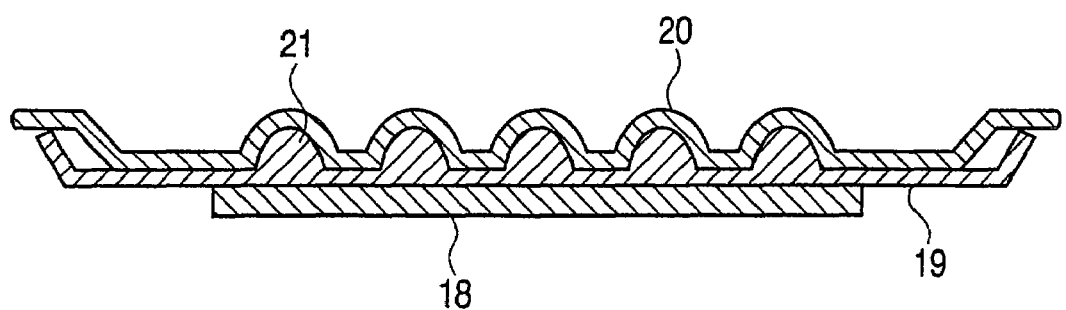
FIG. 3 is a sectional view showing the constitution of a main portion of a high-frequency heating apparatus according to a third embodiment.

FIG. 3 is a sectional view showing the constitution of a main portion of a high-frequency heating apparatus according to a third embodiment.

In FIG. 3, a portion between a high-frequency heating element 19 having a high-frequency heat generating film 18 and a saucer 20 made of metal is filled with ceramic material that is dielectrics. However, gaps 21 corresponding to the gaps 13 in the first embodiment are provided to make a distance between the metal surface of the saucer 20 and the high-frequency heat generating film 18. Other constitution of the high-frequency heating apparatus is the same as that in the first embodiment. In case that chicken dark meat was heated under the above constitution, the scorch could be applied onto the both sides of the meat. We think that this is due to the following reason: Since the distance between the high-frequency heat generating film 18 and the metal surface of the saucer 20 becomes large, the strength of electric field on the high-frequency heat generating film 18 becomes high, and heat generation in the high-frequency heat generating film 18 becomes high; and compared with a case where there is no gap, the amount of the high-frequency wave turning to a surface of the saucer 20 is reduced, whereby without raising the water reduction rate of the chicken dark meat, the proper scorch can be applied onto the both sides.

Further, in the constitution in which the portion between the high-frequency heating element and the saucer is filled with dielectrics, the high-frequency heating element 19 becomes heavy. On the other hand, since heat capacity becomes large, the saucer is difficult to cool in case of regular heating. Further, since the heat capacity is large, when preheating is performed once, the saucer is difficult to cool, so that scorch can be applied also in case of continuous use or tunnel type continuous high-frequency heating.

Embodiment 4

Figure 4:
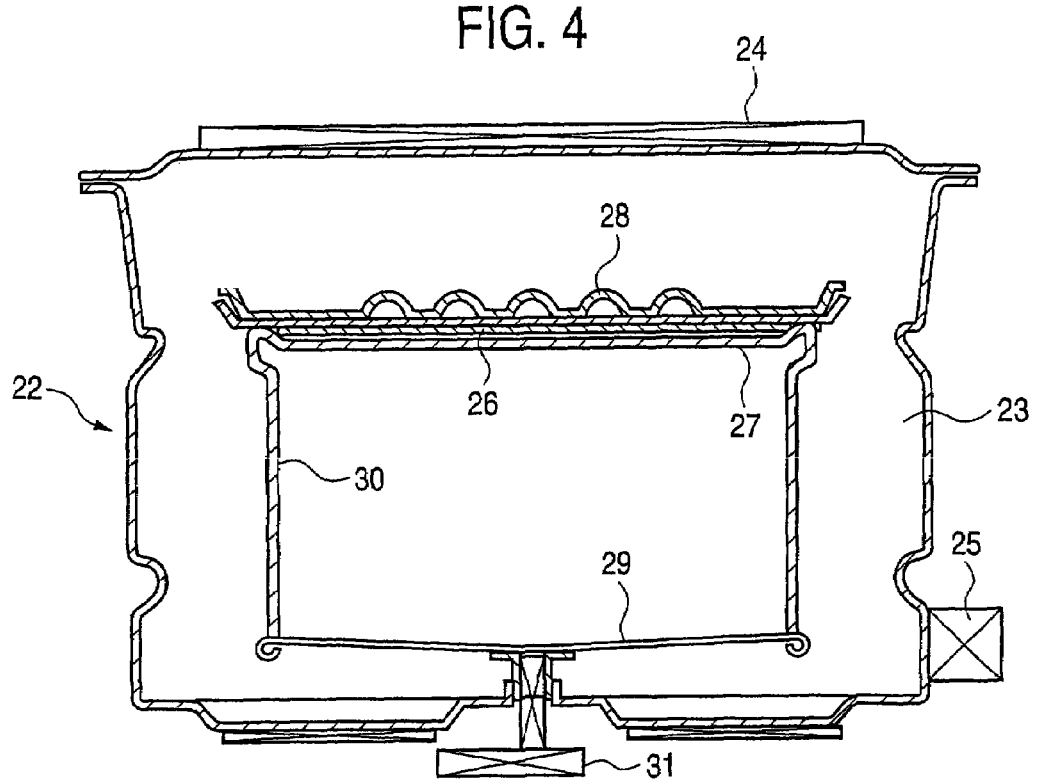
FIG. 4 is a schematic sectional view showing the constitution of a high-frequency heating apparatus according to a fourth embodiment of the invention.

FIG. 4 is a sectional view showing the constitution of a high-frequency heating apparatus according to a fourth embodiment.

A high-frequency heating apparatus 22 comprises a heating room 23 storing therein a subject to be heated; a heating unit 24 for performing heating by a heater, which is provided at the upper portion of the heating room; a high-frequency generating unit 25 which generates a high-frequency wave thereby to perform high-frequency heating; a high-frequency heating element 27 having a high-frequency heat generating film 26 on its rear surface; a saucer 28 for placing the subject to be heated thereon; and a setting net 30 for setting the high-frequency heating element 27 and the saucer 28 on a turntable 29 for placing them into the heating room.

Under the above constitution, the high-frequency wave generated from the high-frequency generating unit 25 is supplied into the heating room 23. The turntable 39 turns by a motor 31, and the high-frequency heat generating film 26 is uniformly irradiated with the high-frequency waves, whereby the saucer 28 is uniformly heated. Therefore, the both sides of the subject to be heated are uniformly heated, and the scorch can be applied properly on the both sides.

Embodiment 5

Figure 5:
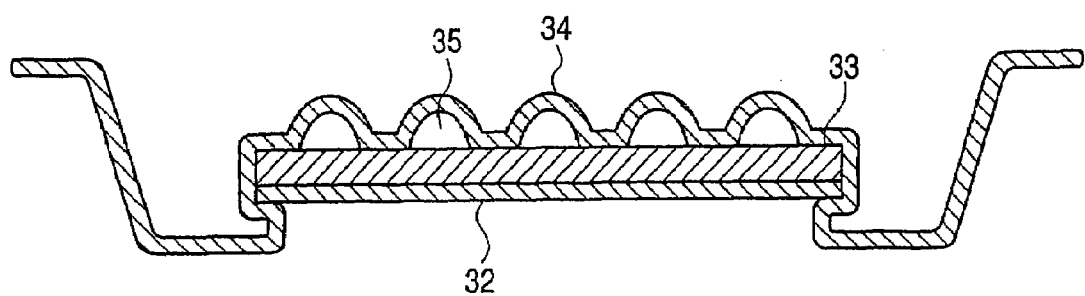
FIG. 5 is a sectional view showing the constitution of a main portion of a high-frequency heating apparatus according to a fifth embodiment.

FIG. 5 is a sectional view showing the constitution of a main portion of a high-frequency heating apparatus according to a fifth embodiment.

In FIG. 5, gaps 35 are provided between a high-frequency heating element 33 having a high-frequency heat generating film 32 and a saucer 34 made of metal thereby to hold the high-frequency heating element 33 on the rear surface of the saucer 34. Other constitution of the high-frequency heating apparatus is similar to that in the first embodiment.

By the above constitution, the scorch applying performance similar to that in the first embodiment could be obtained. Further, since the high-frequency heating element is held at the lower portion of the saucer, the high-frequency heating element unites with the saucer, so that it is not necessary to take out them individually, which is laborsaving.

Embodiment 6

Figure 6:
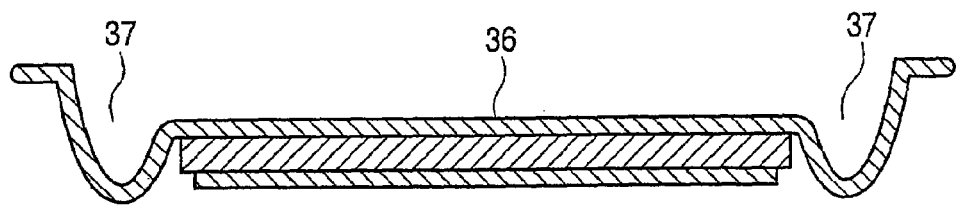
FIG. 6 is a sectional view showing the constitution of a main portion of a high-frequency heating apparatus according to a sixth embodiment.

FIG. 6 is a sectional view showing the constitution of a main portion of a high-frequency heating apparatus according to a sixth embodiment.

In FIG. 6, grooves 37 for storing therein juice flowing out from the subject to be heated are provided for a saucer 36 made of metal. In FIG. 1, the saucer 10 is viewed in front; and in FIG. 6, it is viewed from a side, in which the grooves 37 are provided. Namely, the grooves 37 are provided on the front and rear sides of the saucer 36. Other constitution of the high-frequency heating apparatus is similar to that in the first embodiment.

Since the grooves 37 for storing therein juice flowing out from the subject to be heated are provided, oil that has flown out from the subject to be heated is removed, so that the scorch is more readily applied, and also the subject to be heated is roasted crisply.

Embodiment 7

Figure 7:
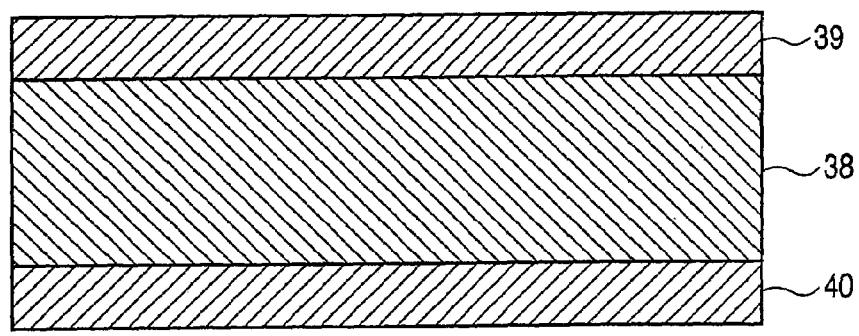
FIG. 7 is a sectional view showing the constitution of a main portion of a high-frequency heating apparatus according to a seventh embodiment.

FIG. 7 is a sectional view showing the constitution of a main part of a saucer used in a high-frequency heating apparatus according to a seventh embodiment.

In FIG. 7, a surface of a saucer member 38 made of metal is covered with a non-adhesive film 39, and a rear surface thereof is covered with a heat absorbing film 40 that is high in heat absorption rate.

By the above constitution, the surface of the saucer is difficult to be stained. Further, since the heat generated from the high-frequency heating element is easier to be absorbed by the saucer, the scorch is easier to be applied.

Embodiment 8

Figure 8:
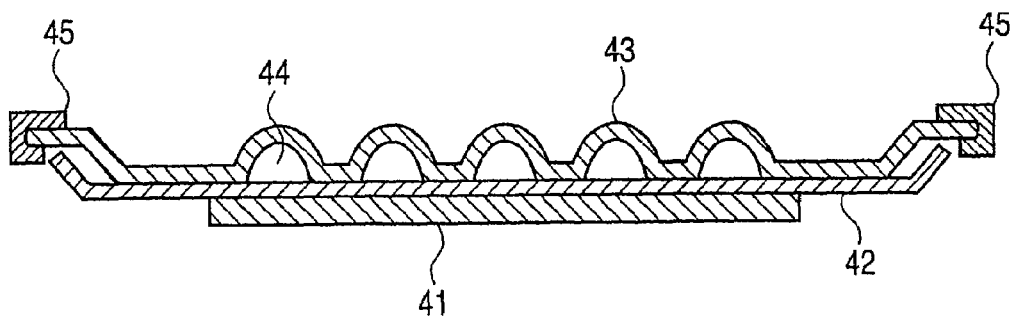
FIG. 8 is a sectional view showing the constitution of a main portion of a high-frequency heating apparatus according to an eighth embodiment.

FIG. 8 is a sectional view showing the constitution of a main portion of a saucer used in a high-frequency heating apparatus according to an eighth embodiment.

In FIG. 8, between a metal-made saucer 43 and a high-frequency heating element 42 having a high-frequency heat generating film 41, gaps 44 corresponding to the gaps 13 in the first embodiment are provided thereby to provide a distance between the metal surface of the saucer 43 and the high-frequency heat generating film 41. And, a holder 45 for preventing contact with a heating room side wall surface is provided on an end surface of the saucer 43. Other constitution of the high-frequency heating apparatus is the same as that in the first embodiment. By the above constitution and the holder, spark caused between the side wall surface of the heating room and the metal portion of the saucer at the high-frequency heating time can be prevented.

Embodiment 9

Figure 9:
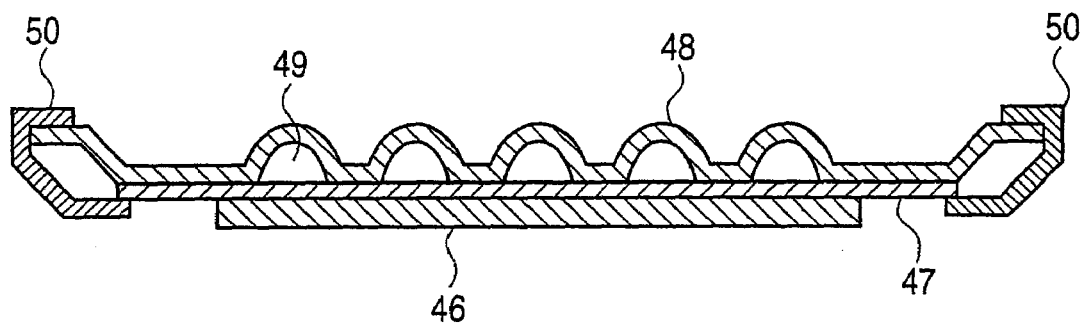
FIG. 9 is a sectional view showing the constitution of a main portion of a high-frequency heating apparatus according to a ninth embodiment.

FIG. 9 is a sectional view showing the constitution of a main portion of a saucer used in a high-frequency heating apparatus according to a ninth embodiment.

In FIG. 9, between a metal-made saucer 48 and a high-frequency heating element 47 having a high-frequency heat generating film 46, gaps 49 corresponding to the gaps 13 in the first embodiment are provided thereby to provide a distance between the metal surface of the saucer 48 and the high-frequency heat generating film 46. And, a holder 50 is provided so as to hold the saucer 48 and the high-frequency heating element 47 in between. Other constitution of the high-frequency heating apparatus is the same as that in the first embodiment. By the above constitution and the holder 50, falling-off of the heating element 47 can be prevented and contact of the high-frequency heating element with a side wall surface of a heating room such as a rail portion can be prevented thereby to prevent spark.

Embodiment 10

Figure 10:
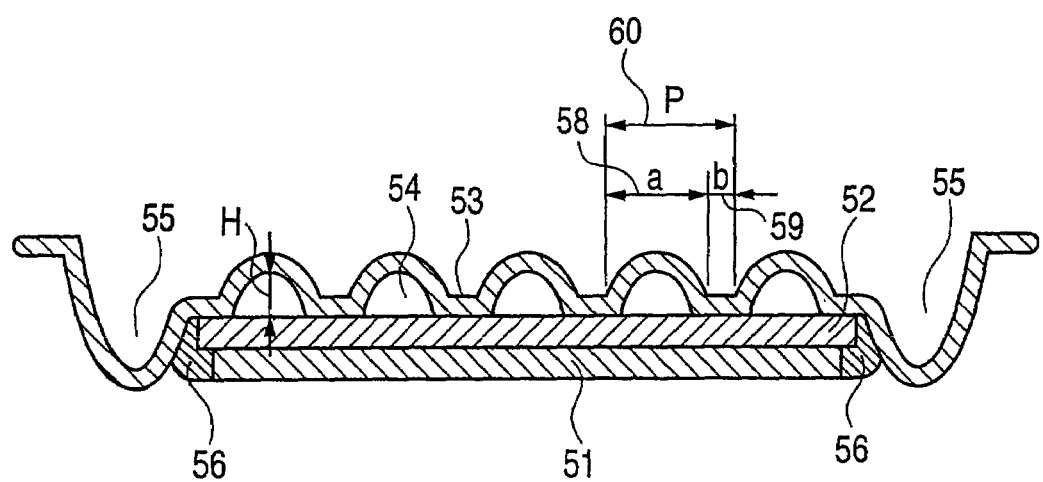
FIG. 10 is a sectional view showing the constitution of a main portion of a high-frequency heating apparatus according to a tenth embodiment.

FIG. 10 is a sectional view showing the constitution of a main portion of a high-frequency heating apparatus according to a tenth embodiment.

In FIG. 10, between a metal-made saucer 53 and a high-frequency heating element 52 having a high-frequency heat generating film 51, gaps 54 corresponding to the gaps 13 in the first embodiment are provided thereby to provide a distance between the metal surface of the saucer 53 and the high-frequency heat generating film 51. Further, a groove 55 for storing juice flowing out from a subject to be heated is provided for the metal-made saucer 53, and the saucer 53 and the high-frequency heating element 52 are adhered with putty 56. Other constitution of the high-frequency heating apparatus is the same as that in the first embodiment. In this case, the groove is provided at whole surroundings, whereby the high-frequency heating element 52 can be adhered at its whole surroundings with the putty 56. The adhesion with the putty 56 is not always unnecessary at the whole surroundings but it may be performed except a part, because the high-frequency heating element 52 and the saucer 53 can be held by adhesion. Hereby, heat generation due to the high-frequency wave between the high-frequency heating element 52 and the saucer 53 is prevented.

Further, the following relation is obtained: a+b=P, in which [a] is width 58 of a convex portion in an uneven portion of the saucer 53, [b] is width 59 of a concave portion therein, and [P] is a pitch 60. Further, the distance in the gap 54 between the high-frequency heating element 52 and the convex portion of the saucer 53 is taken as a height H 57.

Figures 11, 12:
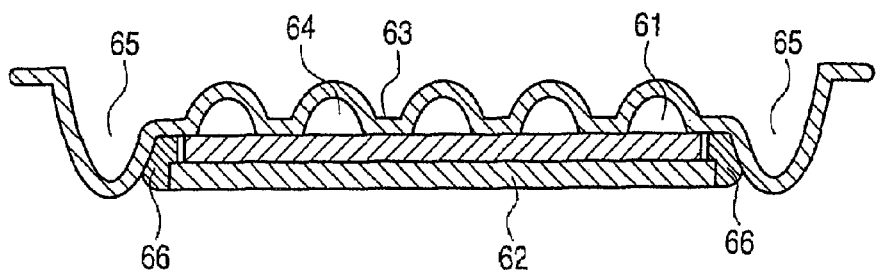
FIG. 11 is a diagram showing characteristic of heat generation of the high-frequency heating apparatus in the tenth embodiment of the invention.
FIG. 12 is a sectional view showing the constitution of a main portion of a high-frequency heating apparatus according to an eleventh embodiment.
Figure 13:
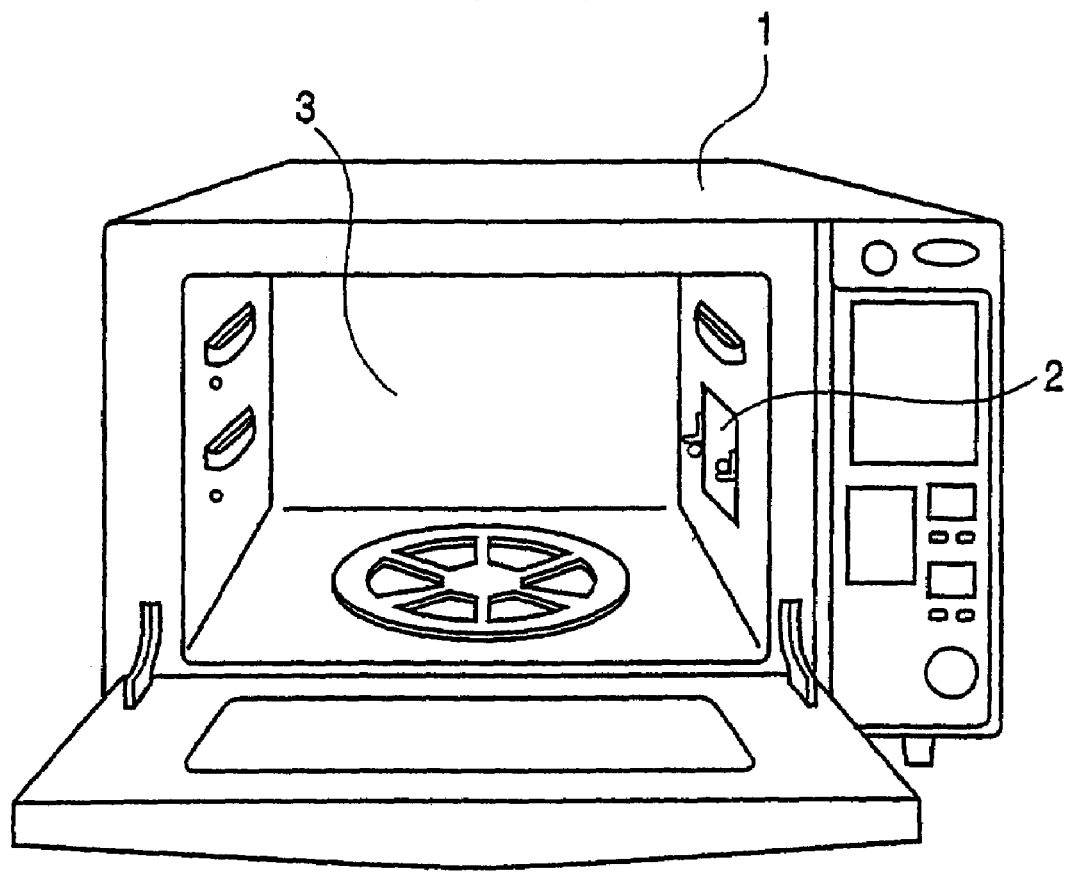
FIG. 13 is a front view showing a conventional high-frequency heating apparatus in perspective.

FIG. 11 is a characteristic table of heat generation in the high-frequency heating apparatus according to the tenth embodiment of the invention.

Herein, as a base material of the high-frequency heating element 52, a liquid crystal glass having sheet thickness of 3 mm is used; and as the high-frequency heat generating film 51, a tin oxide film is used. When a resistant value of the tin oxide film is 400 $\Omega/cm^2$, in case that H is varied from 0 mm to 10 mm, and a, b, and P are varied from 0 mm to 40 mm, a maximum value of a surface temperature at the top of the convex portion of the saucer 53 when the saucer is heated by the high-frequency waves of 1000 W for 5 minutes is shown in FIG. 11. Further, an output conversion value is shown.

Seeing heat generation of the saucer 53 in case that H is varied from 0 mm to 10 mm, it is found that when $2 \leq H \leq 8$, the heat generation is high. It is found that when $3 \leq H \leq 6$, the heat generation is preferably high. Further, in case that a, b, P are varied, as b becomes smaller, the heat generation is lower. This reason is thought as follows: As the width of the concave portion becomes smaller, its contact surface with the high-frequency heating element 52 becomes smaller, so that heat is difficult to transmit to the saucer 53.

Further, as P becomes larger, the heat generation becomes smaller. This reason is though as follows: Even if the contact surface becomes large, absolute quantity of the gap 54, that is, the number of the gaps becomes small, so that heat generating portions are reduced.

Further, the difference by the variation of H, a, b, P of the gap 54 was compared by heating water by high-frequency heating. The comparison was performed under the condition where water of 10° C. and 100 ml was heated at 1000 W for 10 seconds.

In case that there was no uneven portion in the saucer 53, that is, in case that H=0 mm, and a=b=P=0 mm, water temperature rose by 4.8° C. Calculated in terms of outputs, 288 W was supplied to the water.

In case that in the uneven portion of the saucer 53, H=4 mm, a=b=10, and P=20, water temperature rose by 3.0° C. Calculated in terms of outputs, 180 W was supplied to the water.

As shown in FIG. 11, it is found that: in case that the gap 54 has proper space, the high-frequency wave is difficult to turn to the upper surface of the saucer 53, so that correspondingly the high-frequency wave is more supplied to the high-frequency heating element 52. Further, even if turning of the high-frequency wave is reduced, in case that the height H becomes larger, the distance between the saucer and the high-frequency heating element becomes larger, and heat dissipation is performed, so that the heat is difficult to transmit to the saucer.

Further, it was difficult on metal working to make the height H larger than 10 mm. As the pitch P is made larger, the height H can be made larger. However, in order to apply uniform scorch on food, it was difficult to make the pitch large.

As described above, by adjusting the height of the gap 54, the widths of the concave portion and the convex portion, and the pitch, the heat generating temperature on the surface of the saucer 53 can be adjusted. This relation among the height, the widths of the concave and convex portions, and the pitch is obtained similarly also in the first embodiment.

Embodiment 11

FIG. 12 is a sectional view showing the constitution of a main portion of a high-frequency heating apparatus according to an eleventh embodiment.

In FIG. 12, between a metal-made saucer 63 and a high-frequency heating element 62 having a high-frequency heat generating film 61, gaps 64 corresponding to the gaps 13 in the first embodiment are provided thereby to provide a distance between the metal surface of the saucer 63 and the high-frequency heat generating film 61. Further, a groove 65 for storing juice flowing out from a subject to be heated is provided for the metal-made saucer 63, and the saucer 63 and the high-frequency heating element 62 are adhered with putty 66. Other constitution of the high-frequency heating apparatus is the same as that in the first embodiment.

This embodiment is different from the tenth embodiment in that the high-frequency heat generating film 61 is provided on the side of the saucer 63. Hereby, it is possible to prevent the high-frequency heat generating film 61 from being damaged. However, the height of the gap 64, in order to obtain heat generation equivalent to that in the tenth embodiment, requires 5 mm to 9 mm. We think this reason as follows: Since the high-frequency heat generating film 61 is provided on the side of the saucer 63, the distance between the high-frequency heat generating film 61 and a convex portion is reduced by 3 mm sheet thickness of the high-frequency heating element 62; and in order to obtain the gap space similar to that in the tenth embodiment, this height is required.

The relation among the height, the widths of the concave and convex portions, and the pitch similar to the relation in the tenth embodiment is obtained. Namely, as the height, 5 mm to 9 mm is proper; in case that a, b, and P are varied, as b becomes smaller, heat generation is lower; and as P becomes larger, the heat generation becomes lower.

Embodiment 12

Figure 14:
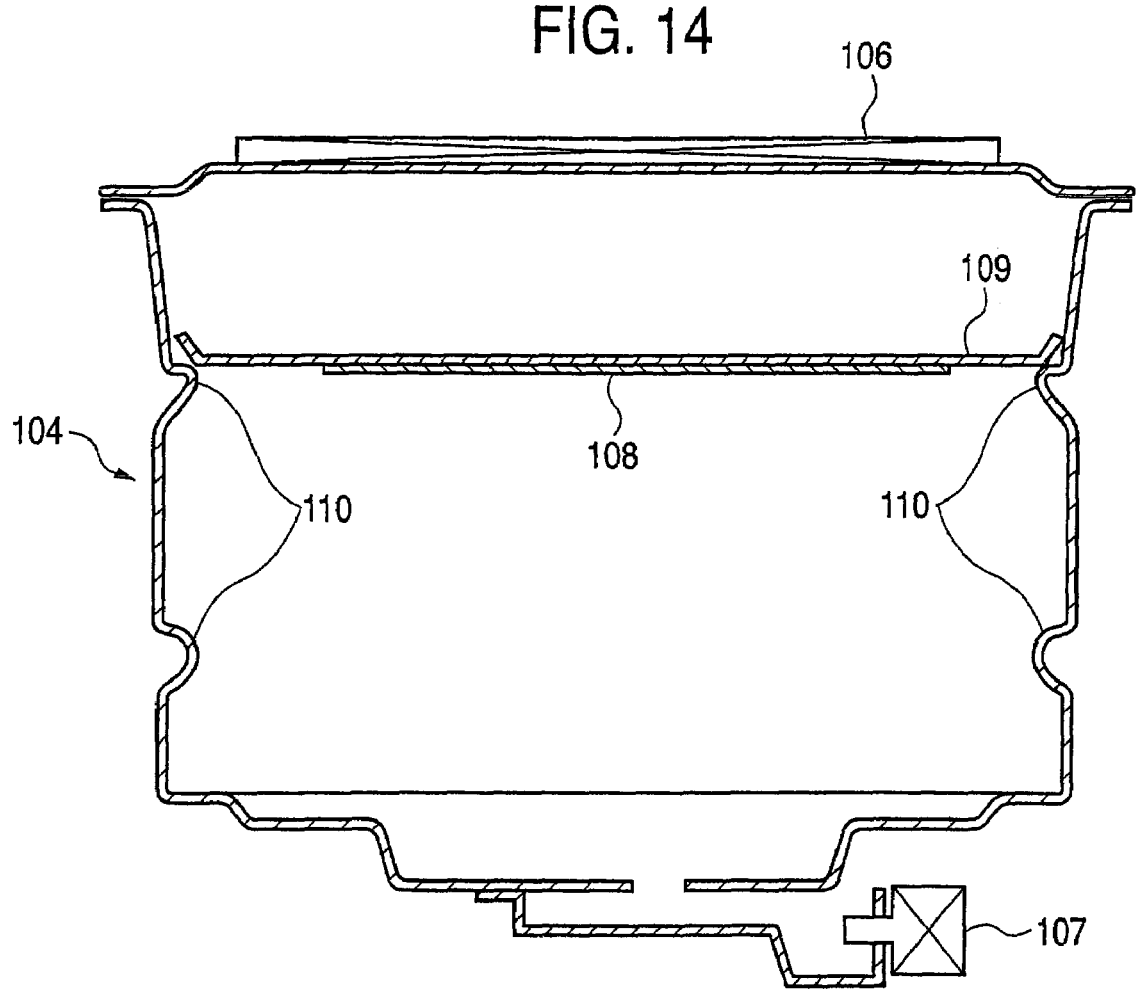
FIG. 14 is a schematic sectional view showing the constitution of a high-frequency heating apparatus according to a twelfth embodiment of the invention.

FIG. 14 is a schematic sectional view showing the constitution of a high-frequency heating apparatus of the invention.

A high-frequency heating apparatus 104 comprises a heating room 105 for storing therein a subject to be heated, a heating unit 106 that is provided at the upper portion of the heating room and performs heater heating, a high-frequency generating unit 107 that is provided at the bottom of the heating room and generates a high-frequency wave to perform high-frequency heating, and a saucer 109 that has a high-frequency heating element 108 on its rear surface and places thereon the subject to be heated. The microwave generated from the high-frequency generating unit 107 is supplied from the downside into the heating room 2. And, the saucer 109 is placed on rails 110 provided on side surfaces of the heating room to be used.

In case that as the saucer 109, a saucer 109 made of ceramic and having a high-frequency heating element 108 made of nitride and boride on its rear surface was used, chicken dark meat was used as a subject to be heated, and heating by the heating unit 106 positioned at the upper portion of the heating room and heating by microwave were performed, the inside of the chicken dark meat was heated by the microwave and further the both sides thereof were scorched, so that the chicken dark meat has been roasted well.

On the other hand, in the conventional microwave oven 1 as described in Japanese Patent Laid-Open No. 2562/1988, the microwave supply port 2 is positioned on a side wall of a heating cooking room 3. Therefore, in case that the saucer has been set into the heating cooking room 3, a portion of the saucer closer to the microwave supply port 2 was heated more, SO that unevenness in heating was produced and the scorch was unevenly applied.

Regarding a rail 110, in case that it is arranged longer in the depth direction, a gap between the saucer 109 and the side wall surface becomes smaller, and the microwave supplied from the downside turns hardly to the upside of the saucer 109, so that the downside of the subject to be heated is more easily scorched.

Regarding the arrangement and constitution of the saucer 109, in order to divide the heating room into up and down portions, the outline of the saucer is formed so that the gap between the saucer and the side wall surface of the heating room and the gap between the saucer and a door for closing the heating room become small, whereby the microwave supplied from the downside turns hardly to the upside of the saucer, the amount of the microwaves supplied to the high-frequency heating element becomes large, and the downside of the subject to be heated is more easily scorched.

As the heating unit 106, in addition to a tube heater, a sheath heater, or the like, a heater using hot wind may be used. Further, though the saucer 109 has the high-frequency heating element 108 on its rear surface and places thereon the subject to be heated, it itself may be formed of ceramic that generates heat by the high-frequency wave.

Embodiment 13

Figure 15:
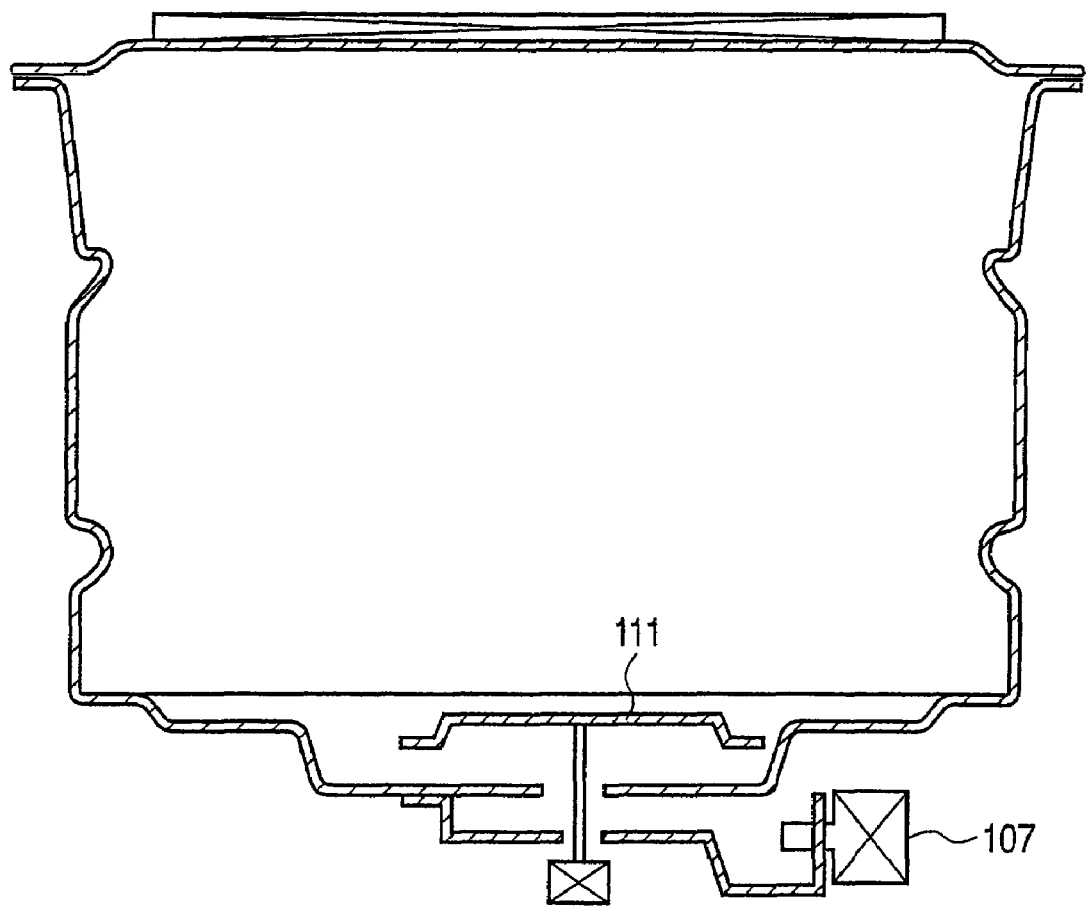
FIG. 15 is a schematic sectional view showing the constitution of a high-frequency heating apparatus according to a thirteenth embodiment of the invention.

FIG. 15 is a schematic sectional view showing the constitution of a high-frequency heating apparatus according to a thirteenth embodiment.

In FIG. 15, reference numeral 111 is a high-frequency dispersion unit which disperses the high-frequency wave thereby to supply it into the heating room in order to irradiate the subject to be heated with the microwave generated from the high-frequency generating unit 107 which is provided at the bottom of the heating room and generates the high-frequency thereby to perform high-frequency heating. Other constitution is similar to that in the embodiment. By this constitution, the microwave is more uniformly supplied from the downside into the heating room 2, so that the subject to be heated can be heated more uniformly.

Embodiment 14

The saucer 109 is formed of metal that does not transmit the microwave in place of the ceramic material. Hereby, the microwave supplied from the downside turns hardly upward, and the amount of the microwaves supplied to the high-frequency heating element becomes large, so that the scorch is more easily applied onto the lower side of the subject to be heated.

Embodiment 15

Figure 16:
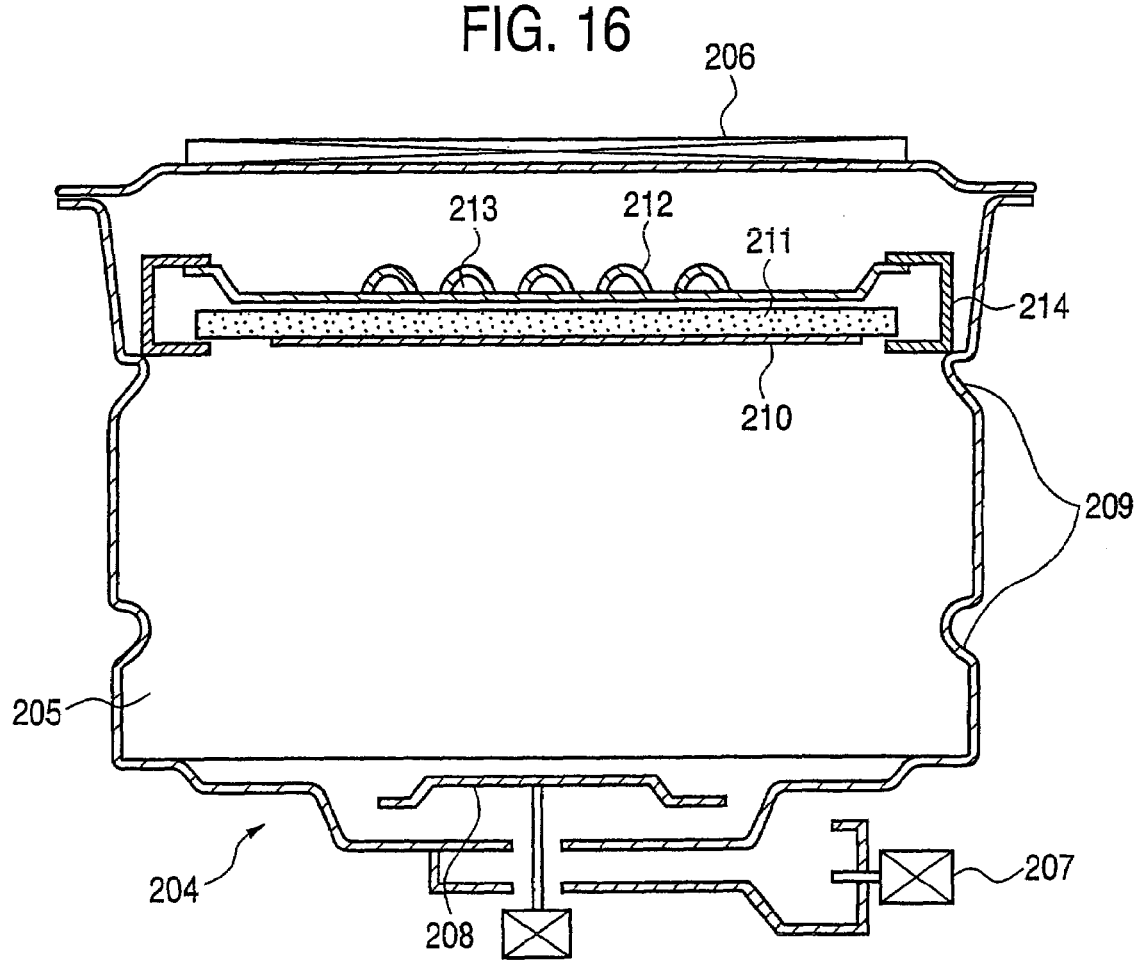
FIG. 16 is a schematic sectional view showing the constitution of a high-frequency heating apparatus according to a fifteenth embodiment of the invention.
Figure 17:
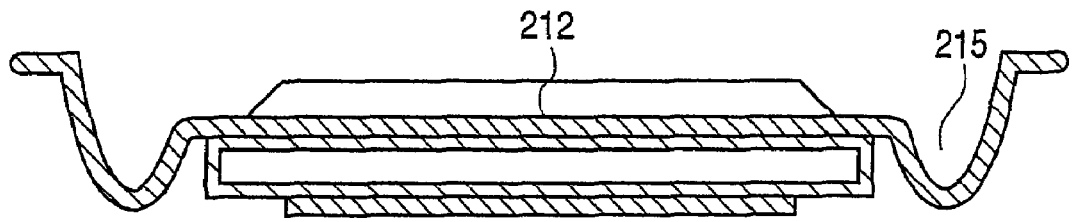
FIG. 17 is a side sectional view of a saucer having a groove in the fifteenth embodiment of the invention.
Figure 19:
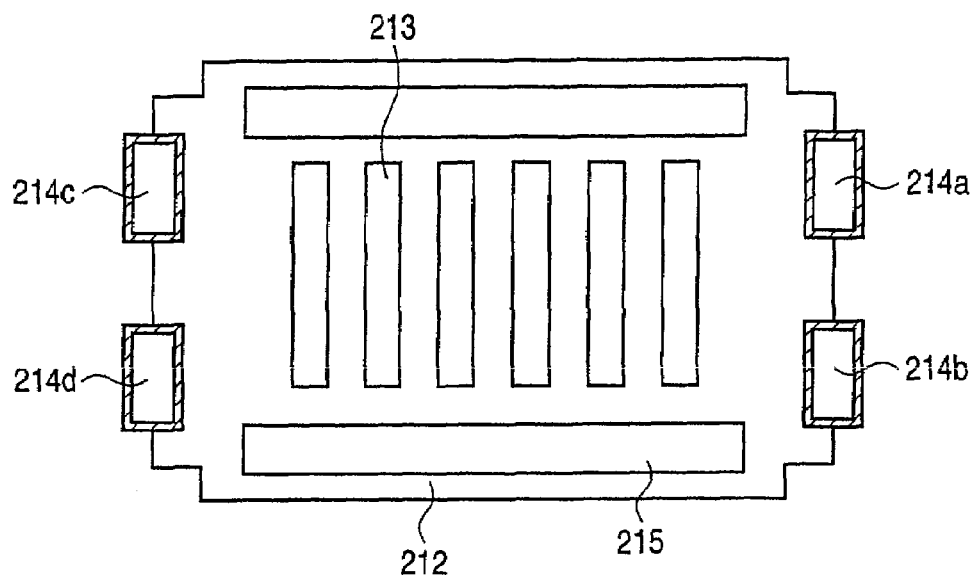
FIG. 19 is a top view of the saucer having four pieces of fixing members in the fifteenth embodiment.

FIG. 16 is a schematic sectional view showing the constitution of a high-frequency heating apparatus of the invention, FIG. 17 is a side sectional view of a saucer having a groove, FIGS. 3A and 3B are enlarged sectional views of a main portion of a fixing member, and FIG. 19 is a top view of a saucer having four pieces of fixing members.

A high-frequency heating apparatus 204 comprises a heating room 205 for storing therein a subject to be heated, a heating unit 206 that is provided at the upper portion of the heating room and performs heater heating, and a high-frequency generating unit 207 that is provided at the bottom of the heating room and generates a high-frequency wave to perform high-frequency heating. The high-frequency wave generated from the high-frequency generating unit 207 is uniformly supplied from the downside into the heating room 205 by a high-frequency dispersing unit 208. On the other hand, rail portions 209 extending in the depth direction are provided on left and right side walls of the heating room 205, and a high-frequency heating element 211 having a high-frequency heat generating film 210 on its rear surface, and a metal-made saucer 212 for placing thereon the subject to be heated are placed on the rail portions 209.

On the other hand, as the high-frequency heating element 211, a high-frequency heating element made of ceramic is used in which a high-frequency heat generating film 210 made of nitride and boride is provided. The saucer 212 has wavy unevenness on its surface, in which a surface of an aluminum-coated steel sheet having gaps 213 is coated with fluorine and a rear surface thereof is coated with black heat-resistant coating. And, the high-frequency heating element 211 and the saucer 212 are joined to and united with each other by a fixing member 214.

At this time, the saucer 212 is placed on the rail portions 209 provided on the left and right side walls of the heating room 205 in the depth direction thereby to divide the heating room 205 into an upper portion and a lower portion in the perpendicular direction.

On the high-frequency dispersing unit 208 located downward, a plate made of ceramic, which is not shown in FIG. 16, is provided at the bottom of the heating room 205, and it can be used as a table on which an subject to be heated such as a cooking object is placed at the high-frequency heating time. Hereby, the cooking object does not splash on the high-frequency dispersing apparatus 208.

Further, as shown in FIG. 17, grooves 215 for storing therein juice flowing out from the subject to be heated are provided for the saucer 212 made of metal. In FIG. 16, the saucer 212 is viewed in front, and in FIG. 17, it is viewed from a side. Namely, the grooves 215 are provided on the front and rear sides of the saucer 212.

Next, operation and working will be described.

When cooking in which the inside of the subject to be heated is heated and scorch is applied to its surface is performed, since the saucer 212 has the high-frequency heating element 211 and the wavy unevenness on its surface thereby to provide the gaps 213, in which the surface of the aluminum-coated steel sheet having gaps 213 is coated with fluorine and the rear surface thereof is coated with black heat-resistant coating, the distance between the high-frequency heat generating film 10 and the metal surface of the saucer 212 becomes large, whereby the strength of electric field on the high-frequency heat generating film 10 becomes high, and heat generation in the high-frequency heat generating film 10 becomes high. Compared with a case where there is no gap 213, the amount of the high-frequency wave turning to a surface of the saucer 212 is reduced, whereby without raising water reduction rate of chicken dark meat, the proper scorch can be applied onto the both sides. According to a experimental demonstration of an inventor, in case that after preheating was performed for ten minutes in a state where the high-frequency heating element and the saucer were put into the apparatus 204, chicken dark meat used as a subject to be heated was heated for ten minutes simultaneously by an upper heater of 600 W that is the heating unit 206 and by high-frequency waves of 300 W, the inside and the both sides of the meat were heated properly. More particularly, the scorch could be evenly applied on the both sides of the meat, so that the chicken dark meat has been roasted well. The water reduction rate is 13%, and the roasted chicken has the proper amount of juice. Further, without requiring labor of overturning the chicken dark meat, the inside of the meat could be also heated and the scorch could be applied onto the both sides of the meat.

Further, in case that the wavy unevenness was not provided for the surface of the saucer 212 and the gaps 213 were not provided, the scorch on the rear side was light, and many high-frequency waves were supplied to the chicken dark meat, so that the water reduction rate of the chicken dark meat became high (24%), the chicken dark meat contracted thereby to become hard, and the scorch was difficult to be applied onto the rear side. This reason is as follows: Since the distance between the high-frequency heat generating film 10 and the metal surface of the saucer 212 is small, the strength of electric field on the high-frequency heat generating film 10 becomes low, heat generation in the high-frequency heat generating film 10 becomes low and the amount of the high-frequency wave turning to the surface of the saucer 212 becomes large, whereby the water reduction rate of the chicken dark meat becomes high, and the scorch becomes difficult to be applied onto the rear side.

Further, by the rail portion 209 provided in the heating room 205, the outline of the saucer 212 is formed so that the gap between the saucer and the side wall surface of the heating room 205 and the gap between the saucer and a door for closing the heating room become small, whereby the high-frequency wave supplied from the downside turns hardly to the upside of the saucer 212, the amount of the microwaves supplied to the high-frequency heating element 211 becomes large, and the downside of the subject to be heated is more easily scorched.

At this time of cooking in which the scorch is applied, the high-frequency heating element 211 and the saucer 212 having on its surface the gaps formed by the wavy unevenness are placed on the rail portions 209 provided in the heating room 205 to be used. Herein, the high-frequency heating element 211 and the saucer 212 are fixed to and united with each other by the fixing member 214, whereby the inside of the subject to be heated is efficiently heated by high-frequency heating, the scorch can be applied onto the surface of the subject to be heated, and it is not necessary to take out the high-frequency heating element 211 and the saucer 212 individually, which is laborsaving. Therefore, it is possible to provide the high-frequency heating apparatus that is convenient in use.

Figure 18A:
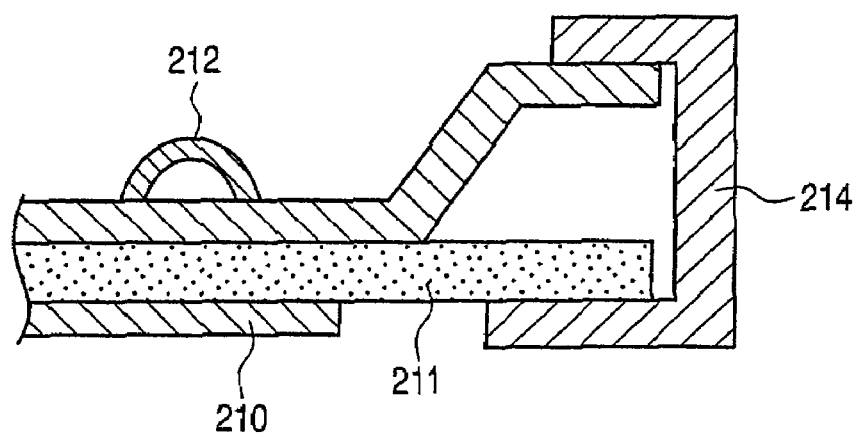
FIG. 18A is a side sectional view of the saucer having the groove in the fifteenth embodiment of the invention.
Figure 18B:
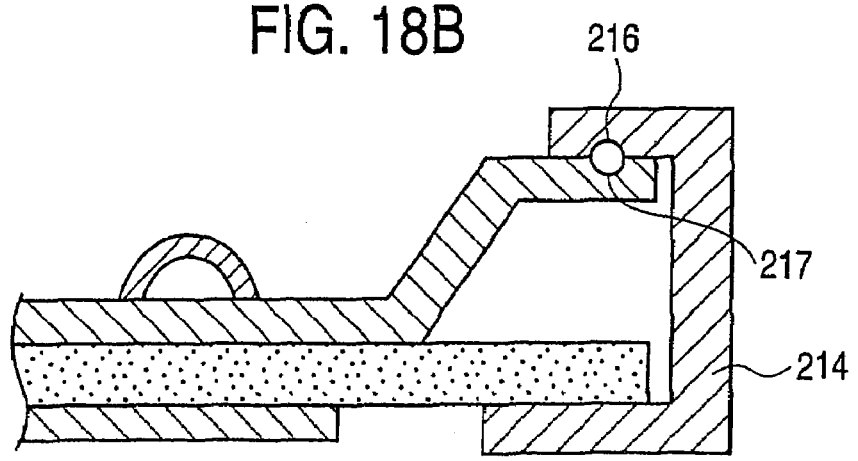
FIG. 18B is enlarged sectional view of a main portion of a fixing member in the fifteenth embodiment.

Next, the fixing member 214, as shown in FIGS. 18A and 18B, is an insertion type and provided in the depth direction of the heating room 205, which fixes the high-frequency heating element 211 and the saucer 212 detachably.

As the insertion type, there is constitution in which the fixing member is inserted so as to hold the high-frequency heating element 211 and the saucer 212 in between, or constitution in which a dowel 216 is provided for the fixing member 214 and fitted into a recess portion 217 of the saucer 212. Hereby, since the invention can correspond to the difference in life in a long use between the high-frequency heating element 211 and the saucer 212, it is not necessary to exchange both of them together, so that maintenance cost is reduced.

Further, the insertion type of fixing members 214 are provided so as to extend in the depth direction of both sides of the heating room 205, so that the fixing members 214 are easy to be inserted into the rail portions 209 provided on the side surfaces of the heating room 205. Further, stains after use of the high-frequency heating element 211 and the saucer 212 can be individually cleaned by taking off the fixing member 214 and separating the high-frequency heating element 211 and the saucer 212, so that the cooker is always clean and cooking can be performed comfortably.

Further, as shown in FIG. 19, the insertion type of fixing members 214 by which the high-frequency heating element 211 and the saucer 212 are detachably joined are provided respectively on the left and right sides in the depth direction of the heating room 205 by two pieces, that is, four pieces of fixing members 214a, 214b, 214c and 214d are provided in total. Hereby, since large power is not necessary to insert the fixing members 214, this is convenient for a housewife, and further cost is somewhat low.

Further, the insertion type of fixing members 214 provided on the left and right sides in the depth direction of the heating room 205 is formed of non-metal body, for example, resin material or ceramic material. Hereby, since gaps can be provided into the heating room 205 at the heat-cooking time, spark generated from the metal-made saucer 212 can be prevented.

Further, the grooves 215 provided for the metal-made saucer 212 is used in order to store therein juice flowing out from the subject to be heated. Since oil that has flown out from the subject to be heated is removed, the scorch is more readily applied, and also the subject to be heated is roasted crisply.

Further, in this example, heater heating and high-frequency heating were simultaneously performed. However, they may be performed individually, or the simultaneous heating and the individual heating may be repeated.

As the heating unit 206, in addition to a tube heater, a sheath heater, or the like, a heater using hot wind may be used. Further, though the high-frequency heating element 211 has the high-frequency heat generating film 210 on its rear surface, it itself may be formed of ceramic that generates heat by the high-frequency wave.

Further, compared with a case where the output port of the microwave is positioned on the side surface, in case that it is positioned on the downside, unevenness in heating is smaller.

Embodiment 16

Figure 20:
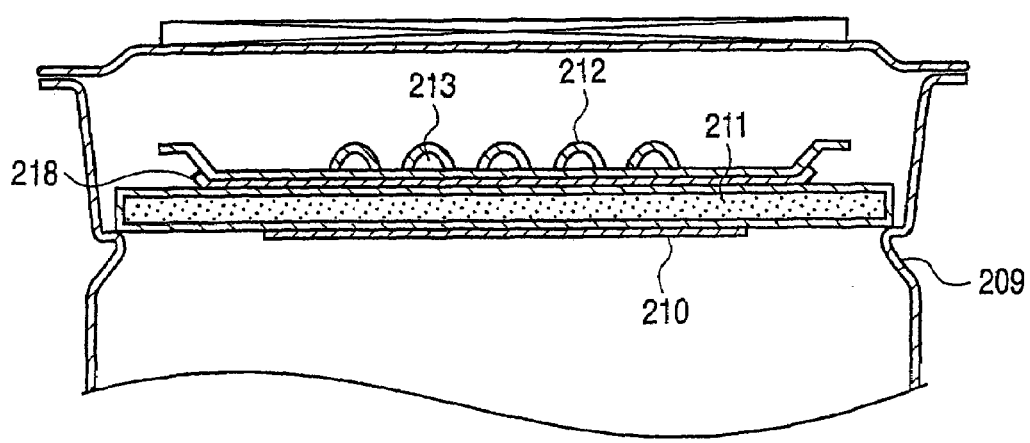
FIG. 20 is a sectional view of a main portion of a high-frequency heating apparatus according to a sixteenth embodiment of the invention.
Figure 21:
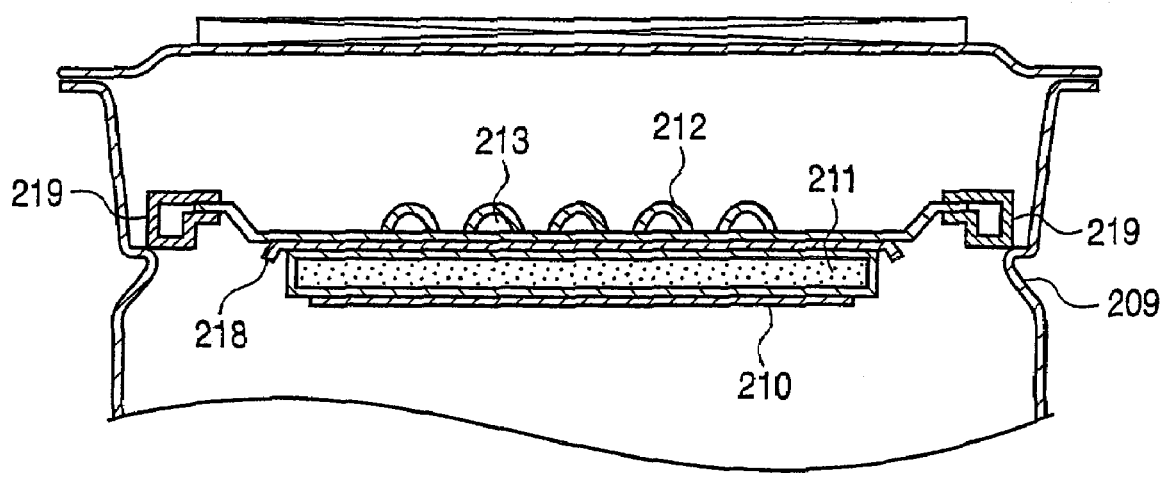
FIG. 21 is a sectional view of an insulating member provided for a saucer in the sixteenth embodiment of the invention.

FIG. 20 is a sectional view showing the constitution of a main portion of a high-frequency heating apparatus according to a sixteenth embodiment, and FIG. 21 is a side sectional view of an insulating member provided for a saucer.

Basically, this high-frequency heating apparatus, similarly to that in the fifteenth embodiment, comprises a high-frequency heating element 211 made of ceramic and a saucer 212 made of metal for placing thereon a subject to be heated, in which the high-frequency heating element 211 and the saucer 212 are placed with a space on rail portions 209 provided on left and right side surfaces of the heating room 205. The sixteenth embodiment is different from the fifteenth embodiment in that the high-frequency heating element 211 and saucer 212 are fixed to and united with each other by an adhesive member 218.

And, the high-frequency heating element 211 and saucer 212 joined and united by the adhesive member 218 are inserted onto the rail portions 209 provided on left and right side surfaces of the heating room 205 in the depth direction.

Under this state, operation and working are similar to those in the fifteenth embodiment. Therefore, they are omitted.

Since the high-frequency heating element 211 and saucer 212 are joined and united by the adhesive member 218, they cannot be disassembled. However, it is prevented that they are lost during storage at the no-use time, and disadvantage due to wrong use for the disassembly by the user does not occur.

Further, the high-frequency heating element 211 and the saucer 212 are fixed to and united with each other by the adhesive member 218, the lateral size of the high-frequency heating element 211 made of ceramic is larger than that of the saucer 212 made of metal, and the high-frequency heating element 211 is placed on the rails 209 provided on the left and right side surfaces of the heating room 205. Hereby, a member for preventing spark generated from the metal-made saucer 212 is not required, so that the number of parts is reduced and the simple constitution is provided.

Further, the high-frequency heating element 211 and the saucer 212 are fixed to and united with each other by the adhesive member 218, the saucer 212 made of metal has insulating members 219 on its left and right sides in the depth direction, and the insulating members 219 are placed on the rails 209 provided on the left and right side surfaces of the heating room 205. Hereby, since gaps can be provided for the heating room 205 at the heat-cooking time, the spark can be prevented.

The present invention is based on Japanese Patent Applications No. 2002-098381, No. 2002-023042, No. 2002-023043, and No. 2002-150323, which are incorporated herein by references. While only certain embodiments of the invention have been specifically described herein, it will be apparent that numerous modifications may be made thereto without departing from the spirit and scope of the invention.

ADVANTAGE OF THE INVENTION

As described above, according to the first to twentieth aspects of the invention, the inside of the subject to be heated is efficiently heated by high-frequency heating, and the scorch can be applied onto the surface of the subject to be heated.

As described above, according to the twenty-first to twenty-fifth aspects of the invention, the saucer having the high-frequency heating element is uniformly heated by the microwave supplied uniformly from the downside. Therefore, cooking in which scorch can be applied uniformly can be performed.

As described above, according to the twenty-sixth to thirty-fourth aspects of the invention, a high-frequency heating apparatus can be provided, which heats efficiently the inside of the subject to be heated by high-frequency heating, can apply the scorch onto the surface of the subject to be heated, and is easy and convenient in use.

What is claimed is:

1. A high-frequency heating apparatus comprising:
   a heating room for storing therein a subject to be heated;
   a heating unit that is provided at an upper portion of the heating room and performs heater heating;
   a high-frequency generating unit that is provided at a bottom of the heating room and generates a high-frequency wave to perform high-frequency heating; and
   a saucer having a high-frequency heating element on a rear surface thereof for placing thereon the subject to be heated,
   wherein the high-frequency heating element and the saucer are placed on rail portions provided on left and right side surfaces of said heating room with the high-frequency heating element and the saucer being detachably joined by an insertion type fixing member.

2. The high-frequency heating apparatus according to claim 1,
   wherein the heating room is divided into two parts by the saucer.

3. The high-frequency heating apparatus according to claim 1, further comprising:
   a high-frequency dispersion unit for dispersing and supplying the high-frequency wave into the heating room.

4. The high-frequency heating apparatus according to claim 1, further comprising:
   rails provided on right and left side surfaces of the heating room in order to place the saucer into the heating room.

5. The high-frequency heating apparatus according to claim 1,
   wherein the saucer is made of metal that does not transmit a microwave.

6. The high-frequency heating apparatus according to claim 1,
wherein the saucer is made of metal; and
wherein the high-frequency heating element includes a high-frequency heat generating film that absorbs the high-frequency wave and generates heat.

7. The high-frequency heating apparatus according to claim 1, further comprising an additional insertion type fixing member, wherein the insertion type fixing members are provided respectively on the left and right sides in the depth direction of the heating room.

8. The high-frequency heating apparatus according to claim 1, further comprising an additional insertion type fixing member, wherein the insertion type fixing members are provided respectively on the left and right sides in the depth direction of the heating room by two pieces so that four pieces of fixing members are provided in total.

9. The high-frequency heating apparatus according to claim 1, further comprising an additional insertion type fixing member, wherein the insertion type fixing members are provided on the left and right sides in the depth direction of the heating room and are formed from a non-metallic material.

10. The high-frequency heating apparatus according to claim 1, further comprising an additional insertion type fixing member, wherein the insertion type fixing members are provided on the left and right sides in the depth direction of the heating room and are formed from a resin material or a ceramic material.

11. A high-frequency heating apparatus comprising:
a heating room for storing therein a subject to be heated;
a heating unit that is provided at an upper portion of the heating room and performs heater heating;
a high-frequency generating unit that is provided at a bottom of the heating room and generates a high-frequency wave to perform high-frequency heating; and
a saucer having a high-frequency heating element on a rear surface thereof for placing thereon the subject to be heated,
wherein the saucer is made of metal;
wherein the high-frequency heating element is made of ceramic and includes a high-frequency heat generating film that absorbs the high-frequency wave and generates heat;
wherein the high-frequency heating element and the saucer are placed on rail portions provided on left and right side surfaces of said heating room;
wherein the high-frequency heating element and the saucer are fixed to and united with each other by an adhesive member; and
wherein said high-frequency heating element is made longer than said saucer and is placed on the rail portions.

12. A high-frequency heating apparatus comprising:
a heating room for storing therein a subject to be heated;
a heating unit that is provided at an upper portion of the heating room and performs heater heating;
a high-frequency generating unit that is provided at a bottom of the heating room and generates a high-frequency wave to perform high-frequency heating; and
a saucer having a high-frequency heating element on a rear surface thereof for placing thereon the subject to be heated,
wherein the saucer is made of metal;
wherein the high-frequency heating element is made of ceramic and includes a high-frequency heat generating film that absorbs the high-frequency wave and generates heat;
wherein the high-frequency heating element and the saucer are placed on rail portions provided on left and right side surfaces of said heating room;
wherein the high-frequency heating element and the saucer are fixed to and united with each other by an adhesive member;
wherein the saucer has insulating members on left and right sides in the depth direction of the heating room, and
wherein the insulating members are placed on the rail portions.

* * * * *